June 26, 1945.   D. B. HOOVER   2,379,154
ALTERNATING AND DIRECT-CURRENT GENERATOR
Filed Nov. 10, 1943
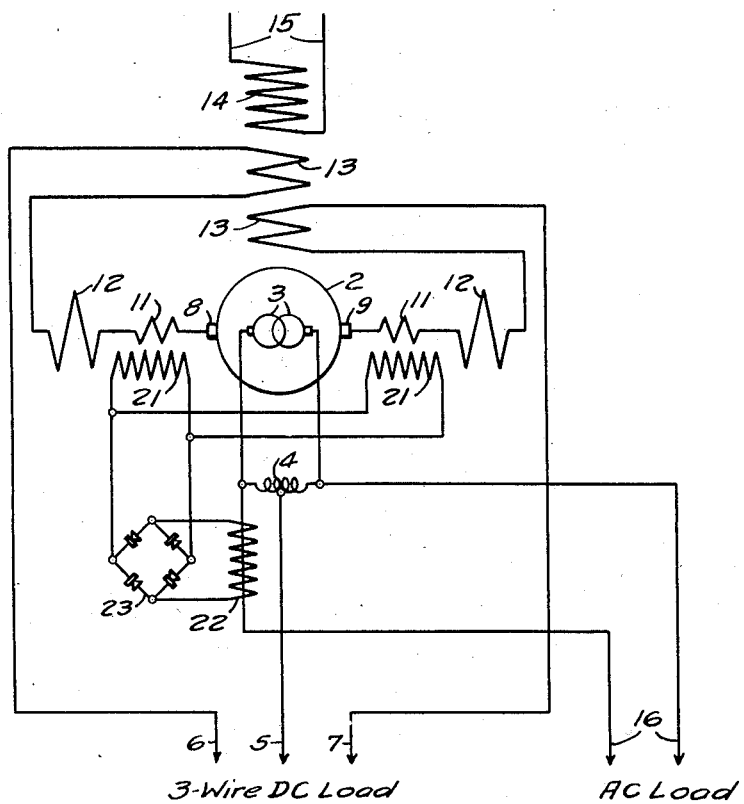
WITNESSES:
INVENTOR
Dillon B. Hoover.
BY
ATTORNEY Patented June 26, 1945

2,379,154

UNITED STATES PATENT OFFICE 2,379,154

ALTERNATING AND DIRECT-CURRENT GENERATOR

Dillon B. Hoover, Swissvale, Pa., assignor to Westinghouse Electric Corporation, East Pittsburgh, Pa., a corporation of Pennsylvania Application November 10, 1943, Serial No. 509,722

2 Claims. (Cl. 171—228)

My invention relates to three-wire direct-current generators which are designed so that good commutation is maintained if a single-phase alternating-current load is also taken off of the slip-rings. My invention has particular relation to three-wire generators which are designed to be as small as possible, so that carefully designed commutating-windings, and usually also compensating windings, are required, in order to obtain good commutation at any direct-current load-condition to which the generator may be subjected.

In a number of instances, the purchaser of a three-wire direct-current generator wishes to take off a variable alternating-current load from the slip-rings which are utilized to energize the balance-coil which provides the neutral conductor or third wire of the three-wire distribution-system. For example, on shipboard, where three-wire direct-current lighting-circuits are utilized, it has been proposed to obtain a certain amount of alternating-current power for operating moving-picture machines and for other purposes. However, it has not been possible, heretofore, with a small, and hence critically designed, three-wire generator, to obtain any considerable amount of alternating-current power without obtaining very bad, and sometimes intolerable, commutating-conditions, particularly when the direct-current load is small, or, in general, when the alternating-current load is large with respect to the direct-current load. Heretofore, this problem would have necessitated the use of a larger frame-size for the three-wire direct-current generator, and even then the commutation has been barely tolerable, even with rather small alternating-current loads.

The object of my present invention is to provide means for furnishing a component of direct-current excitation for the commutating poles of a three-wire direct-current generator, in proportion to the amount of alternating-current which is taken off from the slip-rings of the generator, whereby good commutating conditions are obtained under all operating-conditions.

In the accompanying drawing, the single figure is a diagrammatic view of circuits and apparatus embodying my invention in a preferred form of invention.

A three-wire direct-current generator is shown, comprising a rotor or armature member having both a commutator-cylinder 2 and a pair of slip-rings 3, the latter being utilized to energize a balance coil 4, the mid-point of which provides the neutral conductor 5 of the three-wire distribution-system. The outside wires 6 and 7 of the three-wire distribution-system are connected to the respective brushes 8 and 9 which bear on the commutator-cylinder 2, this connection being completed through certain series field-windings which include commutating-pole windings 11, and which may also include compensating windings 12 and series exciting windings 13. In accordance with the usual practice, these series windings 11, 12 and 13 are divided into two parts, half being connected in each of the outside conductors 6 and 7 of the three-wire system. The generator is also provided with a shunt-type exciting winding 14 which may be energized from any suitable exciting-source which is indicated by the leads 15.

In accordance with my present invention, a variable single-phase alternating current load, represented by the conductors 16, is taken off from the slip-rings 3 which energize the balance-coil 4. I also provide auxiliary commutating-pole windings 21, for augmenting the effect of the series commutating-pole windings 11. These auxiliary commutating-pole windings 21 are energized, in any desired manner, so as to receive a direct-current excitation which is proportional to the alternating-current load. Any suitable means may be utilized for this purpose. The particular means which is illustrated comprises a current-transformer 22 which is connected in series with one of the alternating-current leads 16, and a rectifier-bridge 23 which converts the alternating-current output of the current-transformer 22 into direct current for energizing the auxiliary commutating windings 21. The auxiliary commutating windings 21 may be connected either in series or in parallel, and may be wound either with a large number of turns, for excitation at low current-values and a reasonably high voltage, or with a small number of turns requiring high-current excitation at a low voltage, the number of turns of the current-transformer 22 being properly chosen to give the desired current and voltage relations. I prefer to utilize a large number of turns of rather small wire for the auxiliary commutator-pole windings 21.

The operation of my new generator has proved itself to be all that was expected of it. The commutation was not affected by the alternating-current load, when the commutating-pole flux was strengthened in proper proportion to the alternating current. The commutation was good throughout, under all direct-current and alternating-current load-conditions.

I claim as my invention:

1. A three-wire direct-current generator comprising an armature member having a commutator and slip-rings, brushes bearing on said commutator, a balance-coil energized from said slip-rings, an alternating-current load-circuit also energized from said slip-rings, a three-wire direct-current distribution-circuit having its neutral conductor connected to said balance-coil and its outside conductors connected to the respective brushes, series commutating-pole windings serially connected in said outside conductors, auxiliary commutating-pole windings for augmenting the action of said series commutating-pole windings, means for energizing said auxiliary commutating-pole windings with direct current responsive to the alternating current in said alternating-current load-circuit, and a shunt-type exciting winding for said generator.

2. A three-wire direct-current generator comprising an armature member having a commutator and slip-rings, brushes bearing on said commutator, a balance-coil energized from said slip-rings, an alternating-current load-circuit also energized from said slip-rings, a three-wire direct-current distribution-circuit having its neutral conductor connected to said balance-coil and its outside conductors connected to the respective brushes, series commutating-pole windings and compensating windings serially connected in said outside conductors, auxiliary commutating-pole windings for augmenting the action of said series commutating-pole windings, means for energizing said auxiliary commutating-pole windings with direct current responsive to the alternating current in said alternating-current load-circuit, and a shunt-type exciting winding for said generator.

DILLON B. HOOVER.